US010830106B2

(12) United States Patent
Zimmer et al.

(10) Patent No.: US 10,830,106 B2
(45) Date of Patent: Nov. 10, 2020

(54) SYNCHRONISING A TURBINE WITH AN AC NETWORK ACCORDING TO A TARGET TRAJECTORY FOR THE TARGET DIFFERENCE ANGLE

(71) Applicant: Siemens Aktiengesellschaft, Munich (DE)

(72) Inventors: Gerta Zimmer, Mülheim an der Ruhr (DE); Matthias Heue, Bochum (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/302,025

(22) PCT Filed: Apr. 21, 2017

(86) PCT No.: PCT/EP2017/059508
§ 371 (c)(1),
(2) Date: Nov. 15, 2018

(87) PCT Pub. No.: WO2017/207167
PCT Pub. Date: Dec. 7, 2017

(65) Prior Publication Data
US 2019/0153902 A1  May 23, 2019

(30) Foreign Application Priority Data

May 31, 2016 (EP) ..................... 16172067

(51) Int. Cl.
F01K 7/16 (2006.01)
F01K 13/02 (2006.01)
(Continued)

(52) U.S. Cl.
CPC .............. *F01K 7/165* (2013.01); *F01K 13/02* (2013.01); *H02J 3/00* (2013.01); *H02P 9/04* (2013.01);
(Continued)

(58) Field of Classification Search
CPC ....... F05D 2220/7642; F05D 2270/061; F01K 13/02; H02J 3/00; H02P 9/04
(Continued)

(56) References Cited

U.S. PATENT DOCUMENTS 6,250,877 B1  6/2001  Westphal et al.
7,915,868 B1  3/2011  Maters et al.
(Continued)

FOREIGN PATENT DOCUMENTS

CN  104063584 A  9/2014
EP    1174588 A2  1/2002
(Continued)

OTHER PUBLICATIONS

EP search report dated Dec. 9, 2016, for corresponding EP patent application No. 16172067.7.
(Continued)

*Primary Examiner* — Charles Reid, Jr.
(74) *Attorney, Agent, or Firm* — Wolter Vandyke Davis, PLLC

(57) ABSTRACT

A method for synchronising a turbine with an AC network having a network frequency, having the following steps: A) accelerating the turbine up to a stated rotational speed, without taking into consideration a difference angle between the turbine and the AC network; B) detecting a difference angle between the turbine and the AC network; C) accelerating or decelerating the turbine in such a way that the differential speed follows a target trajectory, wherein the target trajectory is a trajectory that indicates a target rotational speed depending on the detected difference angle, such that a target angular position that is suitable for a synchronous supply is achieved between the turbine and AC network.

11 Claims, 3 Drawing Sheets

(51) Int. Cl.
*H02J 3/00* (2006.01)
*H02P 9/04* (2006.01)
(52) U.S. Cl.
CPC ............... *F05D 2220/7642* (2013.01); *F05D 2270/061* (2013.01)
(58) Field of Classification Search
USPC ........................... 290/42, 43, 45, 53, 54, 55
See application file for complete search history.

(56) References Cited

U.S. PATENT DOCUMENTS

| | | | |
|---|---|---|---|
| 10,305,288 B2 * | 5/2019 | Heue | ....................... F01K 13/02 |
| 2016/0130983 A1 | 5/2016 | Zimmer et al. | |
| 2017/0237263 A1 | 8/2017 | Zimmer et al. | |

FOREIGN PATENT DOCUMENTS

| | | |
|---|---|---|
| EP | 1914394 A1 | 4/2008 |
| EP | 2813675 A1 | 12/2014 |
| EP | 3012420 A1 | 4/2016 |
| JP | S4711174 A | 6/1972 |
| JP | 2000014197 A | 1/2000 |
| JP | 2011135771 A | 7/2011 |

OTHER PUBLICATIONS

International search report and written opinion dated Jul. 6, 2017, for corresponding PCT/EP2017/059508.

* cited by examiner

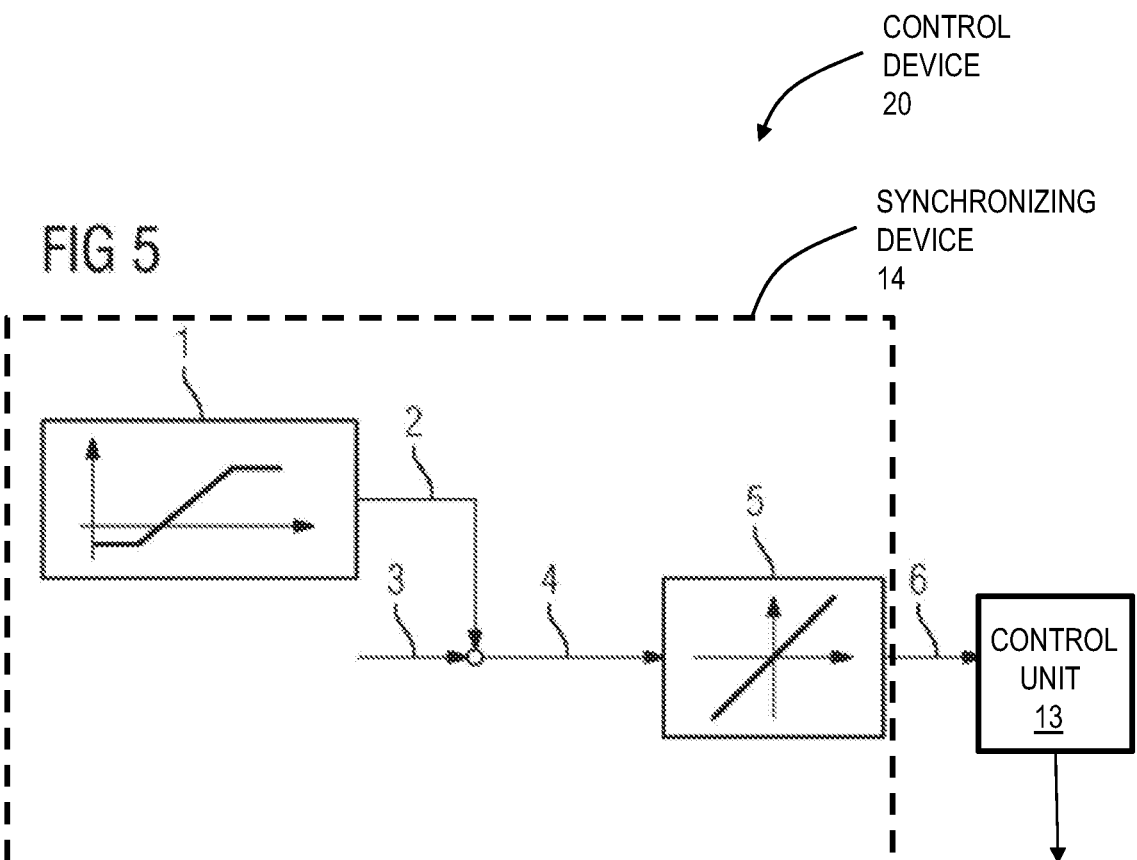
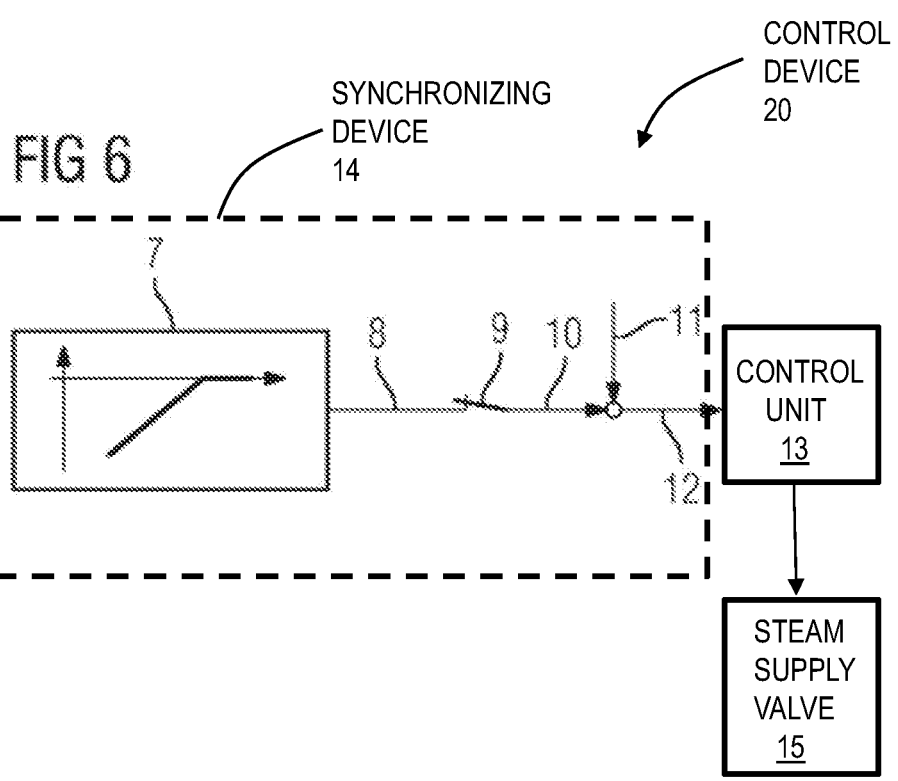

SYNCHRONISING A TURBINE WITH AN AC NETWORK ACCORDING TO A TARGET TRAJECTORY FOR THE TARGET DIFFERENCE ANGLE

CROSS REFERENCE TO RELATED APPLICATIONS

This application is the US National Stage of International Application No. PCT/EP2017/059508 filed Apr. 21, 2017, and claims the benefit thereof. The International Application claims the benefit of European Application No. EP16172067 filed May 31, 2016. All of the applications are incorporated by reference herein in their entirety.

FIELD OF INVENTION

The invention relates to a method for synchronizing a turbine with a power network and an associated control device.

BACKGROUND OF INVENTION

In the case of power generation in power plants in which the generated power is supplied to a power network, it is to be ensured that the power is supplied in-phase. In thermal power plants, in which the power is generated in generators driven by turbines, the turbine is thus to be brought into an angular position matching with the phase of the power network so that the power can be supplied. More precisely, of course, the angular position of the generator rotor is important. Since the rotor of the generator is generally fixedly connected to the rotor of the turbine, reference is always made in the present case to the turbine having to be synchronized, although it is actually the generator.

In the prior art, it is typical to bring the turbine to network frequency independently of the phasing of the power network. The turbine is then brought with the aid of a so-called synchronizing device into the correct angular position. For this purpose, the turbine is slightly accelerated or decelerated, one can refer roughly to moving back and forth, until the angular position is matching.

A method for synchronizing a turbine with a power network is known from EP 3 012 420 A1. This method comprises the following steps: 1) accelerating the turbine up to a frequency in the range of the network frequency; 2) detecting a difference angle between turbine and AC network; 3) detecting a differential speed between turbine and AC network; 4) accelerating or decelerating the turbine such that the turbine follows a target trajectory, wherein the target trajectory is a previously computed trajectory which specifies a target differential speed in dependence on the difference angle, which is to be present so that when speeds of turbine and AC network correspond, a target angular position suitable for a synchronous supply is achieved between turbine and AC network.

SUMMARY OF INVENTION

An object of the present invention is to provide a method for improved synchronization of a turbine with an AC network. The achievement of this object is found in particular in the independent claims. The dependent claims specify embodiments. Further details can be inferred from the description.

It has been recognized that a method for synchronizing a turbine with an AC network having a network frequency is to be provided, which comprises the following steps: step A) accelerating the turbine up to a nominal rotational speed without taking into consideration a difference angle between turbine and AC network; step B): detecting a difference angle between turbine and AC network; step C) accelerating or decelerating the turbine such that the differential speed follows a target trajectory, wherein the target trajectory is a trajectory which specifies a target rotational speed in dependence on the measured difference angle, so that a target angular position suitable for a synchronous supply is achieved between turbine and AC network. The relationship between the trajectory and the final target angle results in this case from a function, with which the measured difference angle is transferred into the target angle. If the measured difference angle is excessively large, the turbine has to be accelerated, if it is excessively small, it has to be decelerated.

Step A) does not differ from the routine procedure in the prior art. The term nominal speed is to clarify that it does not have to be the actual network frequency. Slight variations are known to occur again and again in the network. These can remain unconsidered in step A), and therefore a nominal speed can be selected which deviates from the actual network frequency. This is not to preclude the nominal speed from corresponding to the actual network frequency. This can result due to the network status. Moreover, it should also be possible to bring the nominal speed into accordance with the actual network frequency by way of continuous measurements.

Because of the above-described frequency variations, it is advisable to also detect the network frequency. Of course, this also applies even more for the phasing of the network.

Step C) is decisive for the invention, namely the acceleration or deceleration of the turbine such that the differential speed follows a target trajectory, wherein the target trajectory is a trajectory which, in dependence on the measured difference angle and a function which transfers the measured angle into the target angle, specifies a target differential speed, so that a target angular position between turbine and AC network suitable for a synchronous supply is achieved. It is certainly not only important to achieve the target angular position; it should also take place rapidly. The method presented here enables this in particular.

Although a variety of functions come into consideration for converting the measured difference angle into the target angle, in general a ramp function is suitable, i.e., a linear curve of the target angle starting from the detected difference angle at the beginning of the ramp function up to the desired target angular position.

The target trajectory begins at the detected difference angle between turbine and network at the beginning of step C) with the detected difference angle and ends in the target angular position. In other words, the target differential speed extends in dependence on the detected difference angle at the beginning of step C), i.e., at the beginning of following the target trajectory, up to the target angular position, i.e., the difference angle which is finally desired.

It is to be noted in this case that the target trajectory is based on a target difference angle being specified. The target rotational speed is determined from the deviation between the target difference angle and the actual difference angle. The target rotational speed is a variable which can be used by the typical turbine control units. Reference is therefore made to a determination of the target rotational speed.

In the simple case, it is sufficient to detect the difference angle and to accelerate or decelerate the turbine accordingly. After carrying out step A), the speeds of turbine and network already correspond sufficiently. The acceleration or deceleration of the turbine when following the target trajectory occurs to such a small extent that no relevant difference of turbine frequency and network frequency occurs due to following the target trajectory. Rather, the specification ensures reaching and maintaining the target angular position for a correspondence of network frequency and turbine frequency.

Possible variations of the network frequency are automatically taken into consideration, since the network frequency and the turbine frequency have to correspond if the target angular position is maintained.

It is to be emphasized once again at this point that step A) provides an acceleration of the turbine without consideration of the difference angle. It is thus entirely to be expected that at the end of step A), or a very short time before or after this, an accurate correspondence of turbine frequency and network frequency is already present and nonetheless it is not possible to begin the supply, since the angular position between network and turbine is not suitable. Therefore, it would be entirely reasonable to already detect the difference angle during step A). However, this would require stronger modifications to the method known in the prior art, whereby more extensive adaptation of the measurement technology could also become necessary. To avoid this, step A) can be carried out as in the prior art mentioned at the outset. Steps B) and C) following thereon can be carried out using the known synchronizing device, which generally only has to be programmed differently. The method is thus suitable in particular for already existing power plants, in which the fewest possible structural changes are to be performed.

It is also widespread that novel and advantageous methods are met with discomfort even in the technical world. This discomfort can be reduced greatly in the present case, since apparently a high level of similarity to the known synchronizing method described at the outset is provided.

After step A), the turbine has already practically reached the network frequency. After reaching the target angular position in step C), the power supply can already be begun. In this manner, the time until beginning the power generation may be reduced. A higher economic yield can thus be achieved. A particularly important aspect in this case is that the power is required, sometimes very soon, after the decision to start the power plant. In such a case, it can be of decisive significance for the stability of the power network that the power generation is started rapidly. In this case, a few minutes can be of great economic significance. Two to three more minutes are often required in the prior art for reaching the desired target angular position after the turbine frequency approximately corresponds to the network frequency. This time can be significantly reduced by the present invention.

The acceleration or deceleration of the turbine such that the difference angle follows the target trajectory until reaching the target angular position can take place rapidly. The required time is dependent on the difference angle at the beginning of following the target trajectory. The time until reaching the target angular position is also dependent on the target trajectory, i.e., on how rapidly the target difference angle changes. In other words, the more steeply the target trajectory extends, the faster is the target difference angle equal to the target angular position. Of course, the target trajectory cannot extend arbitrarily steeply, the turbine finally has to be able to be accelerated or decelerated such that the difference angle can actually follow the target trajectory. The possible steepness of the target trajectory is sensitively dependent on the inertia of the turbine. In general, in the case of a heavier and thus more sluggish turbine, the target trajectory can extend less steeply.

In many cases, the nominal rotational speed is exceeded during the acceleration of the turbine up to the nominal rotational speed. A deceleration subsequently takes place.

To comprehend the exceeding of the nominal rotational speed, it is to be considered that the acceleration is dependent on the quantity of steam supplied and this is in turn dependent on the position of a steam supply valve. The change of the position of the steam supply valve requires time, however. The change of the acceleration accordingly requires a certain amount of time.

The overshoot can be significantly reduced by a corresponding selection of the acceleration. More precisely, the attempt is not made to change the acceleration suddenly, but rather to lower it continuously. It is thus possible to significantly reduce the overshoot. In the present case, it has been possible to achieve values of less than 0.02 Hz. Insofar as this is the case, step A) does not take place as is typical in the prior art. This does not change anything in the above statement, however, that step A) can be performed according to the prior art. In particular, it is true that no consideration of the difference angle between turbine and AC network is required for this purpose.

In one embodiment, the target trajectory provides a linear curve of the target difference angle. The target difference angle therefore extends like a ramp. The target rotational speed used for the regulation is determined from the deviation between the target difference angle and the detected difference angle. In this case, it is possible to start with the detected difference angle, wherein the target difference angle extends linearly over time up to the target angular position. This enables a simple target trajectory.

In one embodiment, the turbine is accelerated if the difference angle is greater than the target difference angle given by the target trajectory and decelerated if the difference angle is less than the target difference angle given by the target trajectory. There may also be other options, but this above-described way of following the target trajectory is expedient.

In one embodiment, the differential speed between turbine and AC network is detected and taken into consideration when following the target trajectory. This actual differential speed is regulated out in dependence on the target differential speed defined by the difference angle.

For clarification, it is to be noted that the "differential speed" is to be understood as the metrologically detected differential speed, i.e., the metrologically detected frequency difference between turbine and network. The differential speed therefore represents the frequency difference between turbine and network, wherein the frequency difference can be detected metrologically. In contrast, the target differential speed is formed via the regulation characteristic curve from the deviation between target difference angle and detected difference angle.

It is always also possible to refer to the frequency difference instead of the differential speed. In the present case, reference is made to the target angular position, while this is often referred to as the desired phasing.

In one embodiment, a synchronizing device known in the prior art is used to carry out steps B) and C). As already mentioned above, this is possible and is accompanied by the advantage that the resulting changes to the facility are very small.

The invention also relates to a control device for a turbine, which is configured to control a turbine according to the above-described method. As already mentioned, very minor modifications are required for this purpose. It is often sufficient to perform corresponding programming.

In one embodiment of the control device, a synchronizing device is provided, which is designed to detect a difference angle between turbine and AC network and to transfer instructions for acceleration or deceleration of the turbine to a turbine control unit.

As already mentioned, such synchronizing devices are often already provided to slightly accelerate or decelerate the turbine as described at the outset until the angular position is matching. Such a synchronizing device has to be able to detect the difference angle. It can therefore also be used for the method according to the present invention.

The turbine control unit will be briefly discussed at this point. The turbine control unit regulates the speed of the turbine via the position of a valve, which sets the steam supplied to the steam turbine. The widespread turbine control units require a target rotational speed as an input signal. According to the present method, a target rotational speed is ascertained by the synchronizing device, which can be transferred to the turbine control unit.

BRIEF DESCRIPTION OF THE DRAWINGS

The invention will be explained in greater detail hereafter on the basis of an exemplary embodiment with the use of figures. In the figures:

FIG. 5 shows a schematic construction of the regulation for reaching the target angular position;

FIG. 6 shows the regulation of the turbine frequency up to the nominal rotational speed.

DETAILED DESCRIPTION OF INVENTION

Figure 1:
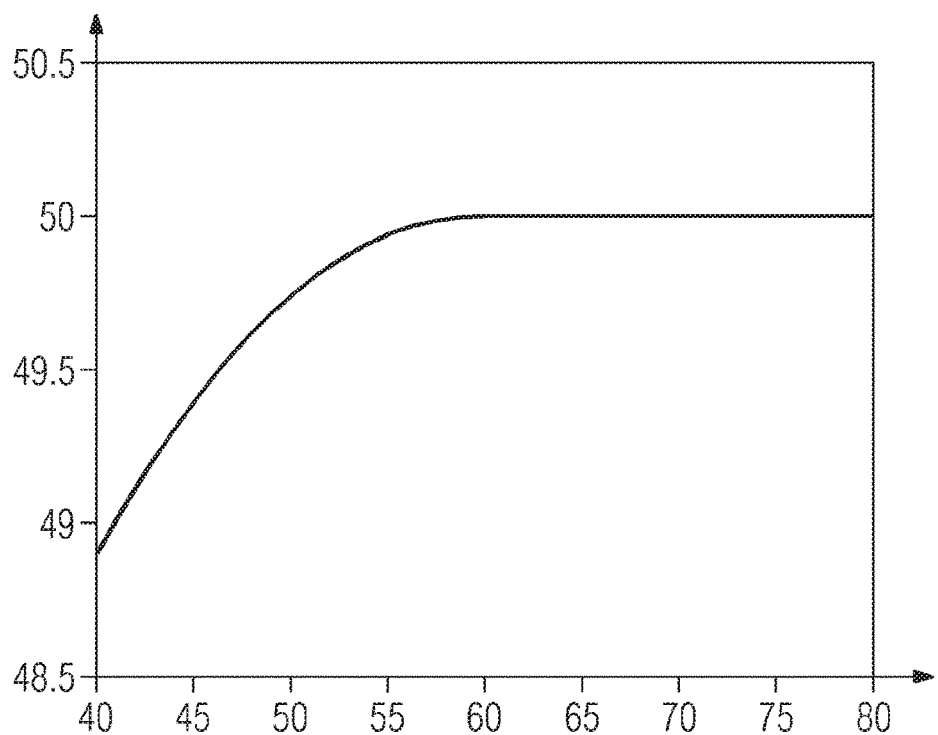
FIG. 1 shows a rotational-speed-regulated acceleration of the turbine.

In FIG. 1, the time in seconds is specified on the abscissa and the turbine frequency in hertz is specified on the ordinate. The rotational-speed-regulated acceleration up to a nominal rotational speed of 50 Hz is shown. The acceleration is regulated and therefore practically no overshoot takes place, i.e., an acceleration of the turbine beyond the nominal rotational speed is substantially avoided.

Figure 2:
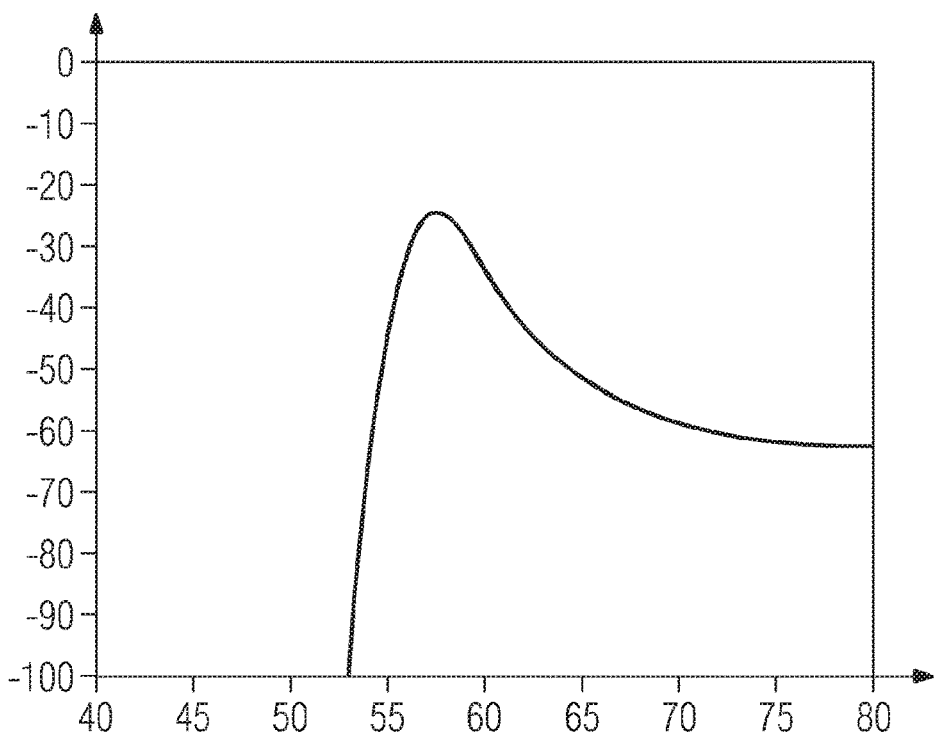
FIG. 2 shows an exemplary curve of the difference angle after reaching a nominal rotational speed.

In FIG. 2, the time in seconds is again on the abscissa and the detected difference angle in degrees is on the ordinate. As in FIG. 1, the time from 40 seconds to 80 seconds after beginning the acceleration is shown. In the case of this exemplary curve of the difference angle, after 80 seconds, i.e., after completion of the acceleration to the nominal rotational speed, a difference angle of −62.5° results.

The turbine thus leads the network by 62.5°. The turbine is therefore now to be rotated more slowly in order to reach a target angle of 0°, wherein turbine frequency and network frequency certainly have to correspond upon reaching the target angle.

Figure 3:
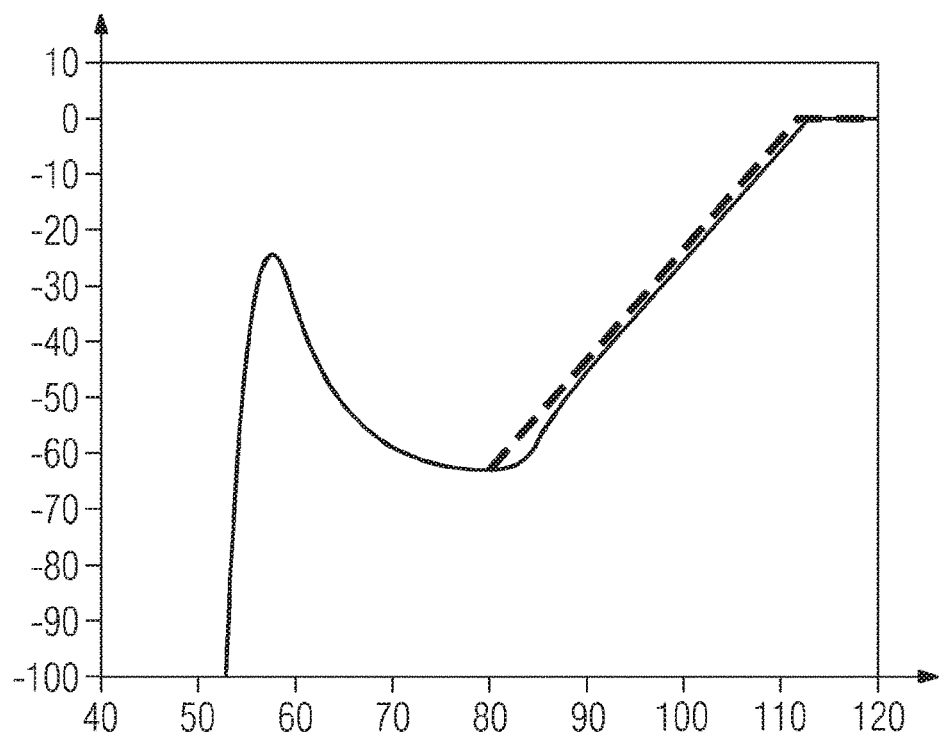
FIG. 3 shows the difference angle being regulated out to a target angular position via a ramp function.

FIG. 3 makes the regulation comprehensible. The time after beginning the acceleration in seconds is plotted on the abscissa and the difference angle between turbine and network is plotted on the ordinate. The solid line shows the curve of the actual difference angle. The curve known from FIG. 2 can be seen from the time value 55 seconds up to the time value 80 seconds. A regulated approach to the target angular position begins thereafter. The dashed line is to be observed for this purpose. This indicates a target difference angle at the respective point in time. The line begins at the time value 80 seconds with the actual difference angle of −62.5°. A difference angle of 0° is finally desired; the target angular position is thus 0°.

To achieve this, a target difference angle curve according to the dashed line is specified. In this case, this is a ramp, i.e., a curve linear over time between the actual difference angle at the beginning of the regulation, in the present case thus −62.5°, and the target angular position, in the present case thus as usual 0°.

It is now possible to continuously compare the detected difference angle to the target difference angle and to accelerate or decelerate the turbine accordingly. As already stated above in conjunction with the overshoot, the acceleration or deceleration cannot be changed arbitrarily rapidly. This is taken into consideration by a limited slope of the ramp and the regulatory feedback of the deviation between target difference angle and detected difference angle.

By way of the linear curve of the target difference angle at the target angular position, the specification is made by the regulation that the difference angle remains constant. If the difference angle remains constant, turbine frequency and network frequency corresponding is achieved automatically.

Figure 4:
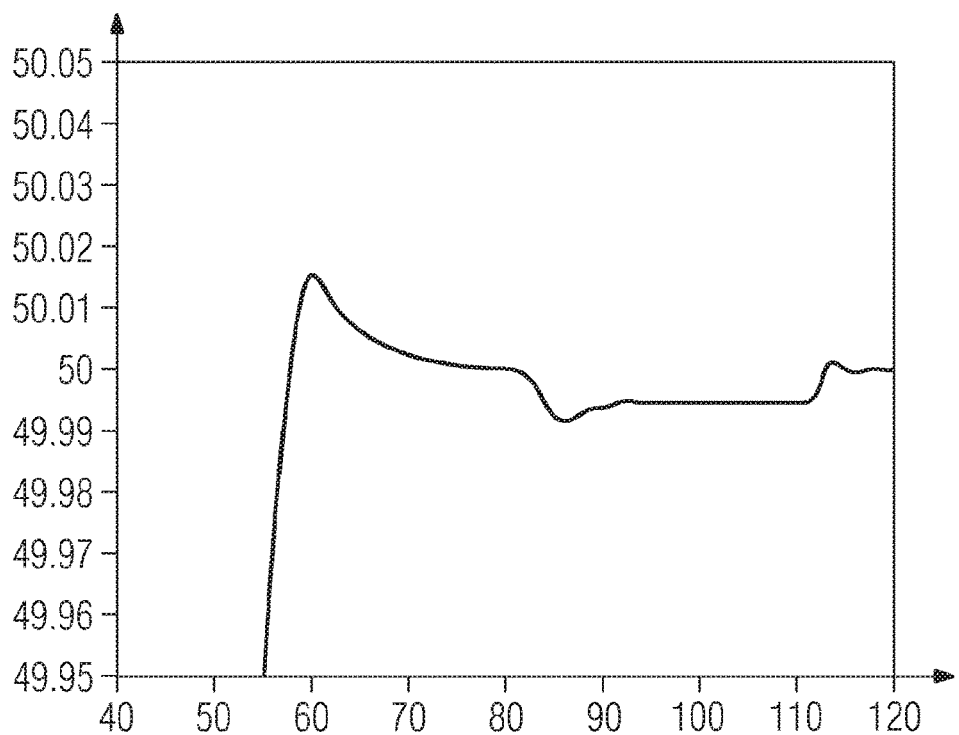
FIG. 4 shows a change of the rotational speed of the turbine during the synchronization.

The curve of the turbine frequency resulting due to the regulation is made clear by FIG. 4. The time after beginning the acceleration in seconds is again plotted on the abscissa and the turbine frequency in hertz is plotted on the ordinate. If one observes the curve of the turbine frequency in the range from 55 seconds to 80 seconds after beginning the acceleration, a slight overshoot of the turbine, i.e., a slight acceleration beyond the network frequency is apparent.

The range which is now actually of interest is the range from 80 seconds after beginning the acceleration. As described above, at the detected difference angle of −62.5°, the turbine temporarily has to be slower than the network. This is achieved in that the target difference angle is followed, as explained in FIG. 3.

The construction of the regulation is schematically shown in FIG. 5. The control device 20 includes the synchronizing device 14 with a target trajectory module 1 that specifies a curve of the target difference angle 2. In this case, a ramp is generally selected as explained in FIG. 3, which extends linearly over time from the difference angle 3 detected at the beginning of the regulation up to the desired target angular position. After reaching the target angular position, the target trajectory extends linearly, it is thus requested that the target angular position is maintained.

The target trajectory module 1 thus outputs the target difference angle 2. This is compared to the detected difference angle 3. The difference angle comparison value 4 thus obtained is transferred to an analysis unit 5 of the synchronizing device 14, which ascertains therefrom by which value the turbine frequency is to be elevated or lowered. A target frequency 6 is thus ascertained, which can be transferred to a turbine control unit 13. The turbine control unit 13 has the task of controlling the position of the steam supply valve 15 for the steam supply and thus the turbine. In the typical turbine control units, this is performed, inter alia, in dependence on a target frequency. Therefore, although it actually relates to the acceleration or deceleration of the turbine, a target frequency 6 is ascertained. The turbine control unit 13 certainly finally in turn ensures an acceleration or deceleration.

The regulation of the turbine frequency by the synchronizing device 14 up to the nominal rotational speed is shown in FIG. 6. An acceleration module 7 specifies a target acceleration 8, i.e., a linear acceleration up to a nominal rotational speed. The target acceleration 8 is output. It is furthermore incorporated as a switching criterion 9 that an adjustment time is to be taken into consideration until the acceleration can be set to zero, since as explained above, the adjustment of the valve 15 which controls the steam supply to the turbine requires a certain amount of time. The target acceleration 8 is converted into a target rotational speed change 10 in consideration of the switching criterion 9. With observation of the network frequency 11, a turbine target frequency 12 results which is transferred to the turbine control unit 13.

Although the invention was illustrated and described in greater detail by the preferred exemplary embodiment, the invention is not thus restricted by the disclosed examples and other variations can be derived therefrom by a person skilled in the art without leaving the scope of protection of the invention.

The invention claimed is:

1. A method for synchronizing, via a control device, a turbine with an AC network having a network frequency, comprising:
   A) accelerating the turbine up to a nominal rotational speed without taking into consideration a difference angle between the turbine and the AC network;
   B) detecting the difference angle between the turbine and the AC network after step A);
   C) accelerating or decelerating the turbine after step A), based on comparing the detected difference angle with a target difference angle of a target trajectory, such that a differential speed follows the target trajectory, wherein the differential speed is a metrologically detected frequency difference between the turbine and the AC network;
   wherein the target trajectory is a trajectory which specifies the target difference angle and a target rotational speed in dependence on the comparison of the detected difference angle with the target difference angle, so that a target angular position suitable for a synchronous supply is achieved between the turbine and the AC network;
   wherein the control device is configured to control the turbine and wherein the control device comprises;
      a target trajectory module configured to output the target trajectory including the target difference angle;
      an analysis unit configured to receive a difference angle comparison value based on a comparison of the target difference angle and the detected difference angle and further configured to ascertain the target rotational speed based on the difference angle comparison value; and
      a turbine control unit configured to receive the target rotational speed from the analysis unit and further configured to adjust a position of a steam supply valve based on the target rotational speed.

2. The method as claimed in claim 1,
   wherein the target trajectory provides a curve of the target difference angle, and wherein step C) comprises comparing the target difference angle with the detected difference angle to determine the target rotational speed.

3. The method as claimed in claim 2, wherein the curve is a linear curve.

4. The method as claimed in claim 2, wherein the target angular position is achieved based on the target difference angle being equal to the detected difference angle.

5. The method as claimed in claim 1,
   wherein step C) comprises accelerating the turbine if the difference angle is greater than the target difference angle given by the target trajectory and wherein step C) comprises decelerating the turbine if the difference angle is less than the target difference angle given by the target trajectory.

6. The method as claimed in claim 1,
   wherein the differential speed between the turbine and the AC network is detected and taken into consideration when following the target trajectory.

7. The method as claimed in claim 1, further comprising:
   a synchronizing device configured to carry out steps B) and C).

8. The method as claimed in claim 1, wherein after the target angular position is achieved, the method further comprises maintaining the target angular position.

9. A control device for the turbine,
   wherein the control device is configured to;
      A) accelerate the turbine up to a nominal rotational speed without taking into consideration a difference angle between the turbine and the AC network;
      B) detect the difference angle between the turbine and the AC network after step A);
      C) accelerate or decelerate the turbine after step A), based on comparing the detected difference angle with a target difference angle of a target trajectory, such that a differential speed follows the target trajectory, wherein the differential speed is a metrologically detected frequency difference between the turbine and the AC network;
   wherein the target trajectory is a trajectory which specifies the target difference angle and a target rotational speed in dependence on the comparison of the detected difference angle with the target difference angle, so that a target angular position suitable for a synchronous supply is achieved between the turbine and the AC network;
   and wherein the control device comprises;
      a target trajectory module configured to output the target trajectory including the target difference angle;
      an analysis unit configured to receive a difference angle comparison value based on a comparison of the target difference angle and the detected difference angle and further configured to ascertain the target rotational speed based on the difference angle comparison value; and
      a turbine control unit configured to receive the target rotational speed from the analysis unit and further configured to adjust a position of a steam supply valve based on the target rotational speed.

10. The control device as claimed in claim 9, further comprising:
   a synchronizing device configured to detect the difference angle between the turbine and the AC network and the differential speed between the turbine and the AC network and to transfer instructions for acceleration or deceleration of the turbine to a turbine control unit.

11. A method for synchronizing, via a control device, a turbine with an AC network having a network frequency, comprising:
   A) accelerating the turbine up to a nominal rotational speed;

B) detecting a difference angle between the turbine and the AC network after step A); and
C) accelerating or decelerating the turbine, based on comparing the detected difference angle with a target difference angle of a target trajectory so that a target angular position suitable for a synchronous supply is achieved between the turbine and the AC network;
wherein the control device is configured to control the turbine and wherein the control device comprises;
  a target trajectory module configured to output the target trajectory including the target difference angle;
  an analysis unit configured to receive a difference angle comparison value based on a comparison of the target difference angle and the detected difference angle and further configured to ascertain the target rotational speed based on the difference angle comparison value; and
  a turbine control unit configured to receive the target rotational speed from the analysis unit and further configured to adjust a position of a steam supply valve based on the target rotational speed.

\* \* \* \* \*